United States Patent
Salmon (10) Patent No.: US 7,415,289 B2
(45) Date of Patent: Aug. 19, 2008

(54) APPARATUS AND METHOD FOR DEPLOYING AN INFORMATION RETRIEVAL SYSTEM

(75) Inventor: Peter C. Salmon, Mountain View, CA (US)

(73) Assignee: Salmon Technologies, LLC, Mountain View, CA (US)

( * ) Notice: Subject to any disclaimer, the term of this patent is extended or adjusted under 35 U.S.C. 154(b) by 0 days.

(21) Appl. No.: 10/666,896

(22) Filed: Sep. 17, 2003

(65) Prior Publication Data

US 2004/0067777 A1    Apr. 8, 2004

Related U.S. Application Data

(60) Provisional application No. 60/415,702, filed on Oct. 2, 2002.

(51) Int. Cl.
*H04M 1/00*    (2006.01)
(52) U.S. Cl. .................................. 455/563; 455/566
(58) Field of Classification Search .............. 455/414.2, 455/566; 704/270; 705/26; 345/633, 107, 345/204; 379/88.01

See application file for complete search history.

(56) References Cited

U.S. PATENT DOCUMENTS

| | | | |
|---|---|---|---|
| 2002/0080927 A1* | 6/2002 | Uppaluru | 379/88.01 |
| 2002/0156634 A1* | 10/2002 | Blum et al. | 704/270 |
| 2002/0167536 A1* | 11/2002 | Valdes et al. | 345/633 |
| 2003/0109286 A1* | 6/2003 | Hack et al. | 455/566 |
| 2003/0208409 A1* | 11/2003 | Mault | 705/26 |
| 2004/0041800 A1* | 3/2004 | Daniels | 345/204 |
| 2004/0095309 A1* | 5/2004 | Vincent et al. | 345/107 |

\* cited by examiner

*Primary Examiner*—Vincent P. Harper
*Assistant Examiner*—Phuoc Doan
(74) *Attorney, Agent, or Firm*—Dorsey & Whitney LLP (57) ABSTRACT

An information retrieval system includes a base station and multiple display stations. A user gives a voice command to one of the display stations and information is retrieved from the base station and displayed in real time; the information may be presented to the user both visually and aurally. The source of the information may be data stored at the base station, or data relayed by the base station from network sources such as the Internet, or from radio or television broadcast stations. The display station has a pull-down screen that can operate like a shade; it retracts using the energy in a wound-up spring.

15 Claims, 6 Drawing Sheets

APPARATUS AND METHOD FOR DEPLOYING AN INFORMATION RETRIEVAL SYSTEM

RELATED APPLICATIONS

This application claims priority to provisional application Ser. No. 60/415,702 filed Oct. 2, 2002.

BACKGROUND OF THE INVENTION

1. Field of the Invention

This invention relates to information retrieval systems, and more particularly to wireless information retrieval systems employing flexible display screens.

2. Description of the Related Art

The Internet provides a rich repository of information, and search tools are available for finding information quickly. However, such information can generally be accessed only by a computing element such as a desktop, laptop, personal digital assistant, PDA, or cell phone. The desktop and laptop typically have medium size display screens that make viewing comfortable and convenient, but they take several minutes to set up in an operating condition. Sometimes they occupy too much desk space in a home or office environment. PDAs and cell phones typically have smaller screens that severely limit the amount of information that can be displayed, but they are easier to carry and quicker to deploy.

Tuners for receiving radio and television signals have been available for many decades. Both visual and aural broadcast information can be digitized and accessed through a computer by methods known in the art. Modems for receiving information from the Internet are also readily available as computer peripherals. Recently, the infrastructure for wireless communications has developed to the point where cellular base stations and cell phones are commonplace, and wireless transceivers are appearing in many commercial products such as computer peripherals and consumer devices.

In the workplace and in the home, space is not always available to set up a computer with a large display screen. It is desirable to provide a large display screen capability that is easy to deploy, and does not carry the cost burden of a full-scale computer with each display. Thus a display station in the form of a "thin client" would be advantageous, providing a large high-resolution display screen without the bulk and expense of the accompanying computer.

The art of building a spring mechanism into a sunshade to create a retractable shade is well established. The shade can be manually lowered, and then retracted by providing a small additional pull. The additional pull releases a hook mechanism, as will be further described, and allows the internal spring to roll it up. Such shade devices appear in many homes and businesses.

The art of building flexible interconnection circuits is also well known. Methods for assembling packaged parts, IC chips, and surface mount components onto flexible printed circuit boards are known, including the method of flip chip assembly for bare die.

Speech recognition circuits are effective and available for processing a relatively small vocabulary, such as a set of voice commands to an information retrieval system.

A developing art exists for light emitting displays that emit light directly, rather than modulating light from a source such as a backlight. The display back plane includes an array of switching elements provided for controlling light emission at each pixel of the light emitting display. The switching elements can be thin film transistors, TFTs, similar to those employed in liquid crystal display, LCD, panels. Organic light emitting diode, OLED, displays are currently in a rapid state of development. Light emitting polymer, LEP is another name for such displays. Flexible OLEDs or FOLEDs have also been described. Small displays have been integrated into commercial products, and some as large as having 17-inch diagonal screens have been introduced. Most of these displays are bottom-emitting; this means that they are designed to emit light through the substrate, using transparent indium tin oxide as the anode conductor. Top-emitting displays (TOLEDs) have also been described; their light does not pass through the display substrate. These are also referred to as transparent cathode displays. For good color rendition, the substrate for a bottom-emitting display must be transparent and clear. Clear flexible plastic films have been described as substrates for bottom-emitting displays including poly ethylene terepthalate (PET, also known as polyester), and poly ether sulfone (PES). These substrates can be subjected to temperatures as high as 200° C. for brief periods. Accordingly, methods of fabricating TFTs using polysilicon as the semiconductor material have been developed, wherein the substrate temperature does not exceed 200° C. Another approach uses amorphous silicon to fabricate the TFTs. In addition, ink-jet printers have been adapted to precisely dispense tiny spots of organic light-emitting material at each pixel site of an OLED display.

SUMMARY OF THE INVENTION

The present invention combines a number of existing capabilities into an innovative information retrieval system. A base station is wirelessly connected to one or more display stations. The base station has programmable features for customizing the type and content of information that can be accessed, and for registering authenticated users. Typically data is captured and stored at the base station covering topics of interest to the users of the information system. However, the base station may also relay information that is available from broadcast or Internet sources to the display stations.

Once the information system is set up, a user typically interacts with one of the display stations rather than with the base station. The display stations hang on the walls of a building and may be retractable. In the first preferred embodiment of the display screen, a bottom-emitting display is built on a clear flexible substrate material. In the second preferred embodiment, a top-emitting display is built on a flexible substrate material, preferably a polyimide such as Kapton or a liquid crystal polymer (LCP); these are typically not transparent and clear. Electronic components are mounted on a narrow strip of the flexible substrate; the preferred arrangement is to use bare die assembled by the flip chip method, although packaged parts may be used. The preferred human interface consists of voice command and visual response. The user provides a voice command to a display station; the requested information is retrieved from the base station and displayed in real time. Aural responses may also be employed. In each display station, IC chips provide memory, display drivers, a central processing unit (CPU) in the form of a micro-controller, and a radio frequency (RF) transceiver for communicating with the base station. Together with batteries or other stored energy devices, the IC chips are contained in a long thin electronic box that extends below the screen. When the screen is extended for viewing, the weight of the box causes the flexible screen to hang straight.

A user typically operates the information retrieval system as follows. If a display station is retracted, the user first extends the screen for use, and then provides a voice command corresponding to the desired information. The set of usable voice commands has been previously programmed into the base station. The information accessed preferably includes visual and aural information, and is sourced from information stored at the base station, or received and relayed by the base station from broadcast or networked sources. The base station includes a full-fledged computer including a user interface with keyboard, display, memory, speech recognition (voice processing) capabilities, plus file storage and wireless communication capabilities. Preferably it also includes software for customizing the user interface and for uniquely identifying authorized users by their voice signatures.

Each voice command is received by a selected display station, converted to electronic form, and communicated to the base station. The base station responds by wirelessly transmitting the requested information back to the selected display station whereupon it is presented, all in real time. In the following example, the invention is used to assist a cook in a restaurant, who may need assistance with a particular recipe. He pulls down the screen and gives the voice command "entree". The screen responds with a list of all the entrees available on the menu, and he makes a selection by voice. The screen responds with the full set of ingredients, and waits for a command such as "Next", or "Done". If the cook says "Next", instructions for the first step in the entree preparation process are displayed, perhaps including a picture of the desired result. At any point the cook may say "Next" to see the next step in the process, "Previous" to back up a step, or "Done" to quit. In this manner the user steps through the process at a pace convenient to him or her. In this case, it is helpful that the cook enjoys hands free operation during the command and response sequence; only a glance over his or her shoulder is required to retrieve the information at each step. Another deployment example would be for an office worker to pull down the screen and say "CNN" to get the latest news on his or her preferred channel. For this application, additional IC chips would provide audio output capability, and sound would come from floor or wall-mounted speakers, or from headphones connected to a jack in the electronic box.

Before displaying sensitive information, it may be useful to authenticate a user, by testing his or her unique voice patterns. For example, a voice signature may be created for all valid users, typically at the base station computer. The base station will then authenticate users by testing their voice signature before sending any requested display information. The authentication of users may be invoked only if the requested information is categorized as sensitive. Sensitive information may also be displayed for only a brief predetermined interval.

DESCRIPTION OF THE PREFERRED EMBODIMENTS

Figure 1:
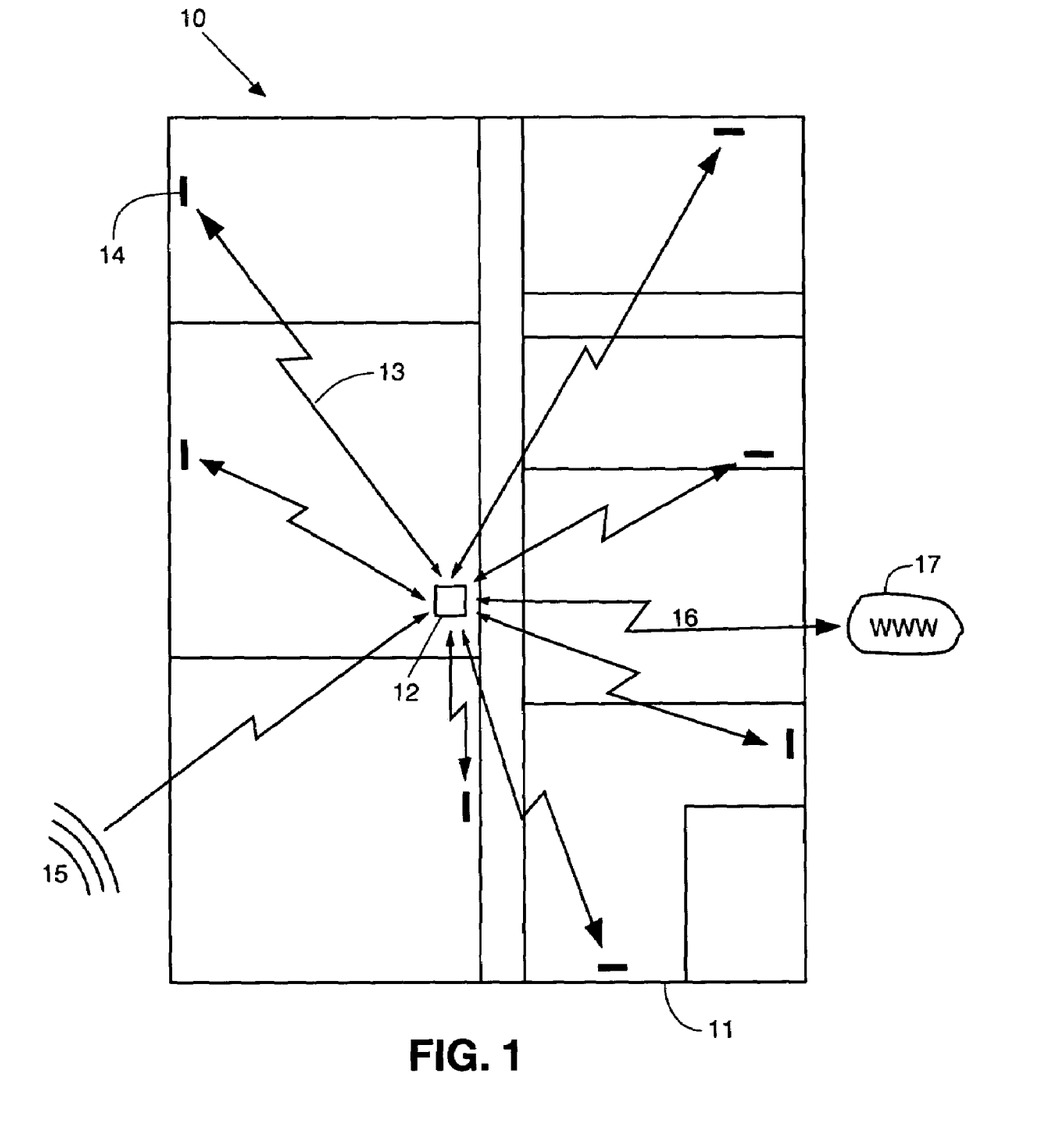
FIG. 1 is a schematic plan view of a building with a base station communicating wirelessly with multiple display stations, the World Wide Web, and broadcast sources.

FIG. 1 shows an information retrieval system 10 of the current invention installed in a building 11 that may be a portion of a home or a workplace, including several rooms or one large room. Base station 12 is in two-way communication using radio waves 13 with a number of display stations such as 14 that are mounted on the walls. In order for simultaneous communications with multiple display screens not to interfere with one another, communications with the base station are channelized. This may be achieved using a sectorized antenna pattern, with a distinct lobe radiating outward from the base station for each channel. Alternatively, each display station may communicate with the base station on a different frequency, or using differently coded information. These methods are known in the art. Base station 12 preferably also receives broadcast radio waves 15 from radio and television stations, and communicates via wired or wireless means such as 16 with external networks 17 such as the World Wide Web.

Figure 2:
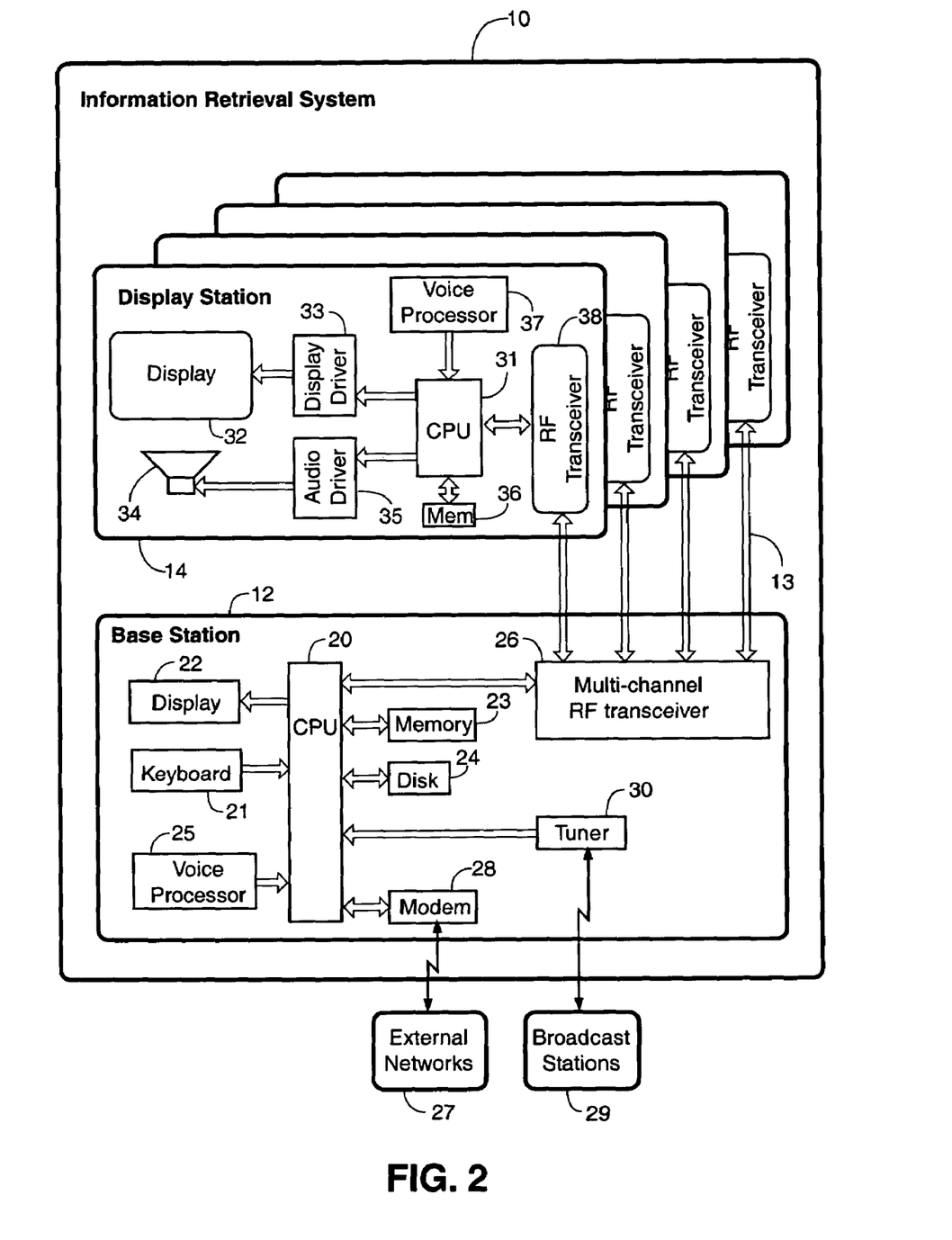
FIG. 2 is a block diagram of the information retrieval system of the current invention showing major functional blocks and data flows.

FIG. 2 is a functional block diagram of information retrieval system 10, showing the primary data flows. Information retrieval system 10 includes at least one base station 12 with multiple display stations 14, each one wirelessly connected through a separate RF channel 13 to a base station. If there are multiple base stations in system 10, they will also connect wirelessly through separate RF channels (not shown). Base station 12 includes CPU 20 supported by a user entry device such as keyboard 21, user display 22, semiconductor memory 23, and storage disk 24. CPU 20 also receives inputs from voice processor 25 and connects through a bi-directional digital interface to multi-channel RF transceiver 26. CPU 20 may receive information from external networks 27 through modem 28, and also from broadcast stations 29 through tuner 30. Display station 14 includes CPU 31 feeding display 32 through display driver 33. Audio output is obtained at speakers 34 or headphones (not shown), driven by CPU 31 through audio driver 35. CPU 31 is supported by memory 36, also receives inputs from voice processor 37, and connects through a bi-directional digital interface to single channel RF transceiver 38.

Figure 3A:
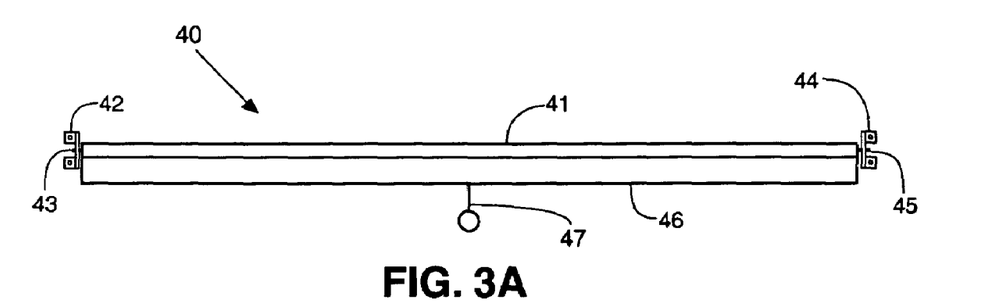
FIG. 3A is a front view of a display station, rolled up in its stored position.

FIG. 3A shows the display station in stored form, 40, with the flexible screen rolled up 41. A left-hand bracket 42 has a slot to accept tab 43, as will be further described. Right-hand bracket 44 has a hole to accept pin 45 as will also be further described. An electronics box 46 hangs below the rolled up screen 41, and pull 47 is available so that a user may deploy the display screen by pulling it downwards.

Figure 3B:
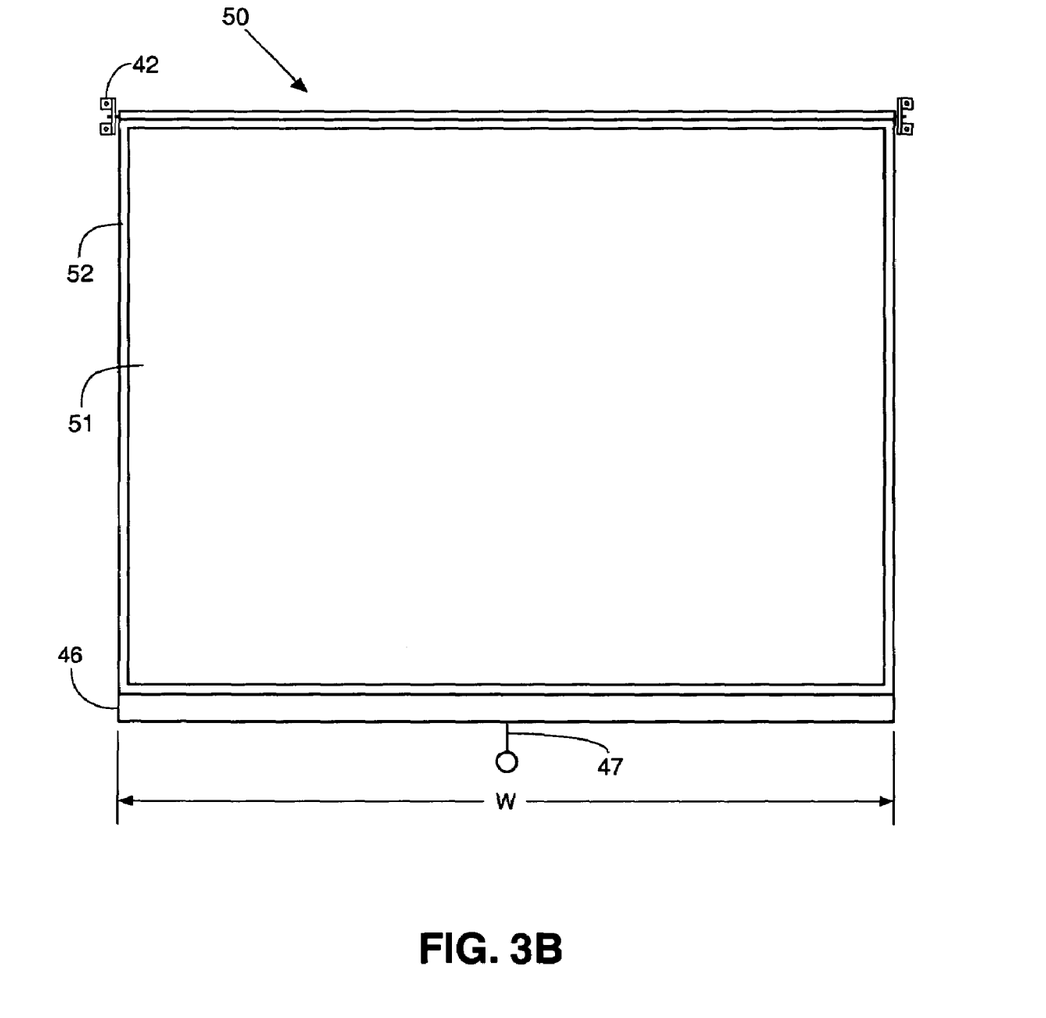
FIG. 3B is a front view of a display station that has been extended for viewing.

FIG. 3B shows the display station deployed in extended form 50. Electronics box 46 is shown attached at the bottom of screen 51; it's modest weight causes screen 51 to hang straight without unduly stressing the support hardware such as bracket 42. Pull 47 is shown attached to box 46. The display portion of the screen, 51, is shown, with a border 52. The screen may be of any size and shape. However, a preferred aspect ratio for the display portion 51 is 4:3, consistent with a display standard such as XVGA, with 1024×768 pixels in the x and y directions, respectively. The width, W, of the screen may be 61 cm (24 inches) for example, allowing easy viewing by multiple people in an office environment. As the OLED technology matures, displays with widths of a meter or more may become available.

Figure 4A:
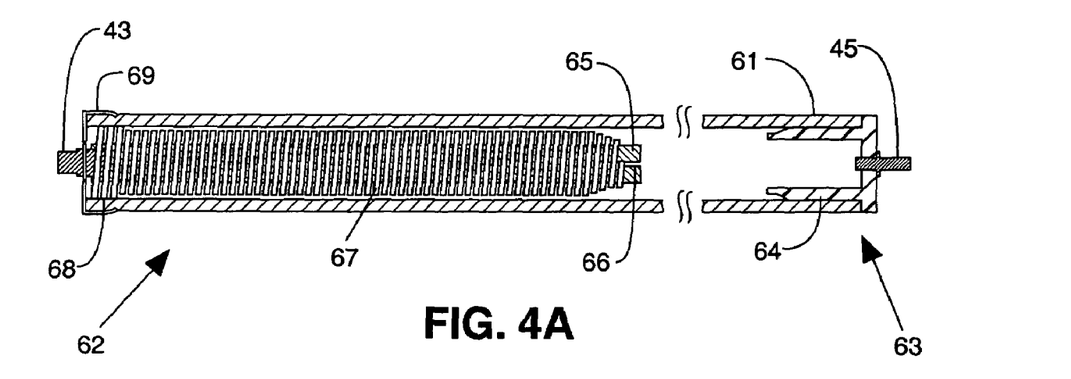
FIG. 4A is a cut-away view of the internals of a cylindrical core of the flexible display.

FIG. 4A shows a cutaway view of display cylinder 61, together with its internal components. Cylinder 61 is typically made of cardboard; it has a typical outside diameter of 25 mm and a typical wall thickness of 3 mm. A spring assembly 62 is shown at the left end of cylinder 61, and a pin holder assembly 63 is shown at the right end. Pin holder assembly 63 includes a plastic insert 64 that is pushed into the end of cylinder 61, and provides support for pin 45. Spring assembly 62 includes a plastic core 65 with a slot 66 to capture one end of spring 67. The other end of spring 67 has an increased diameter 68 to form a press fit inside the left end of cylinder 61. Tab 43 is inserted through a hole in end cap 69 and fixed to the left end of core 65 by insertion into a slot (not shown). Thus spring 67 is secured in such a manner that it can be wound up when tab 43 is rotated while cylinder 61 is stationary. In actual deployment, tab 43 is held stationary in the slot of left hand bracket 42, and cylinder 61 rotates around the tab (when the user pulls downward on pull 47), causing spring 67 to wind up.

Figure 4B:
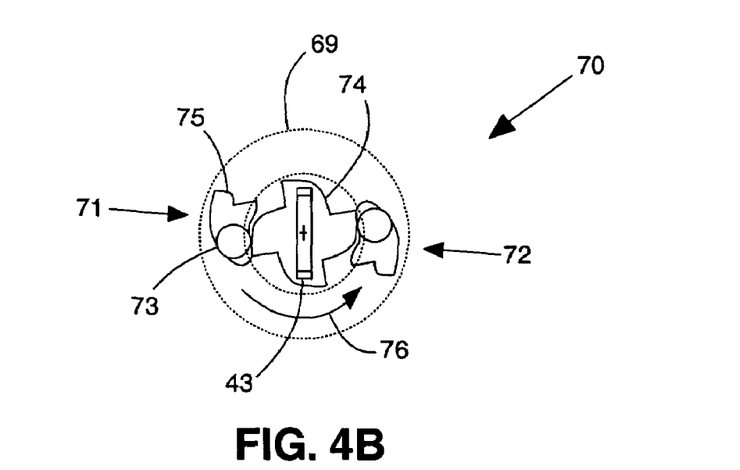
FIG. 4B is an end view of the shade mechanism showing the relative orientation of the parts while the shade is being pulled down and the spring is being wound up.

It is desirable to have a convenient way to latch the screen in its extended position. This capability is described in reference to FIGS. 4B and 4C. Shade mechanism 70 is shown in FIG. 4B to illustrate the orientation of the parts when the screen is being pulled down. A pair of hooks 71 and 72 rotate around shafts such as 73 affixed to end cap 69, which is shown in dotted outline to illustrate the combination. Hooks 71 and 72 have a shape that can interlock with a cam 74 affixed to the base of tab 43. However, when the display screen is pulled down, hooks 71 and 72 rotate into the positions shown and don't engage cam 74, as spring 67 is wound up. The rotation of cylinder 61 and end cap 69 is counterclockwise in this case, as indicated by arrow 76.

Figure 4C:
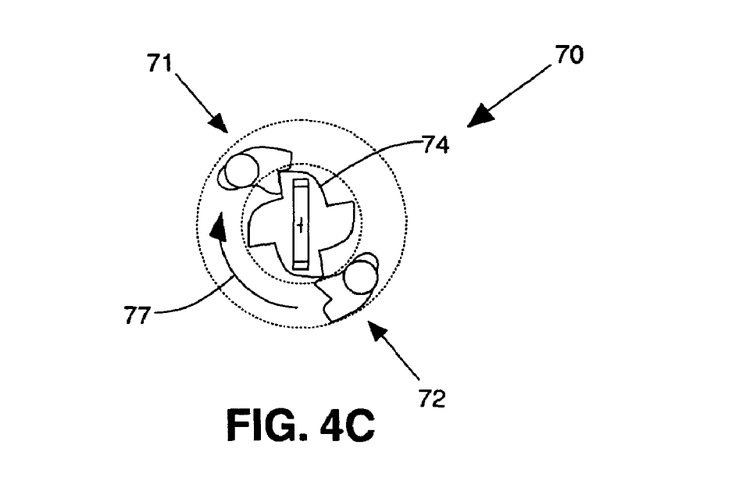
FIG. 4C is an end view of the shade mechanism showing the relative orientation of the parts when the shade has been extended and locked in position.

FIG. 4C shows the situation for mechanism 70 when the user pauses the action of pulling down the display screen. Hook 71 has rotated under gravity into a position where it interlocks with cam 74 as shown. The effect of the wound up spring is to apply torque to cylinder 61 in the direction shown by arrow 77, such as to maintain the locked position. If the display screen is subsequently tugged downward, the interlock is released and the screen can wind up under the influence of spring 67.

Figure 5A:
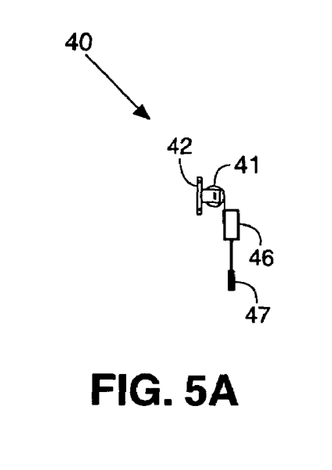
FIG. 5A is an end view of a display station in its stored position.

FIG. 5A is an end view of the display station in stored form 40. Left bracket 42 is shown in relation to wound up screen 41, electronic box 46, and pull 47.

Figure 5B:
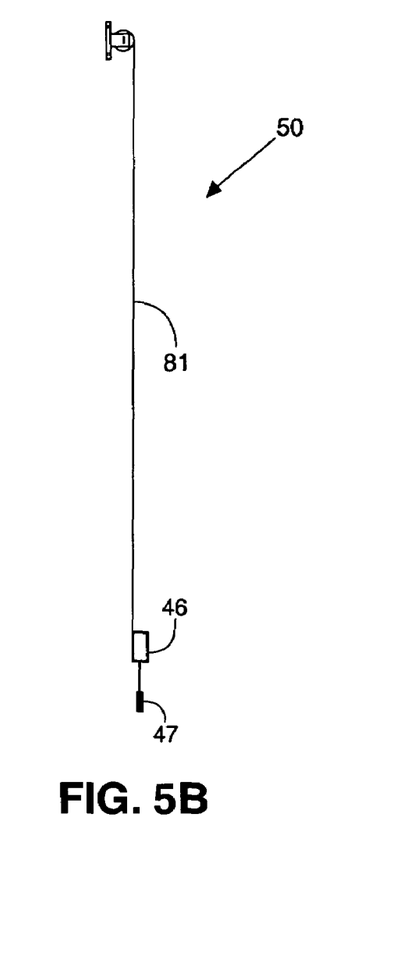
FIG. 5B is an end view of a display station that has been extended for viewing.

FIG. 5B is an end view of the display station in expanded form 50, with flexible substrate 81 weighted by electronics box 46. The weight of electronics box 46 causes flexible substrate 81 to hang straight, avoiding wrinkles that would degrade the image displayed.

Figure 6:
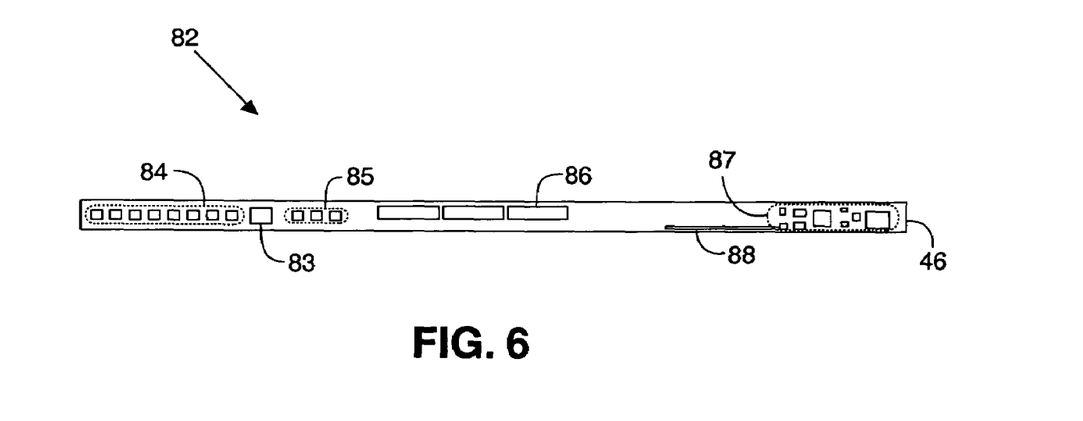
FIG. 6 shows a narrow strip of electronic devices in support of the display station.

FIG. 6 shows the physical contents 82 of electronic box 46, as attached to the bottom edge of flexible substrate 81. Included are a micro-controller chip 83 implementing the CPU function 31, a group of memory and display driver chips 84 implementing display driver 33, a group of audio chips 85 implementing audio driver 35 and speech processor 37, batteries 86, and a group of radio-frequency (RF) chips 87. Supported by micro-controller 83, RF group 87 provides wireless transceiver 38 for communicating with base station 12. Packaged parts may also be used in place of the bare die chips such as 83. RF antenna 88 is also shown.

Figure 7:
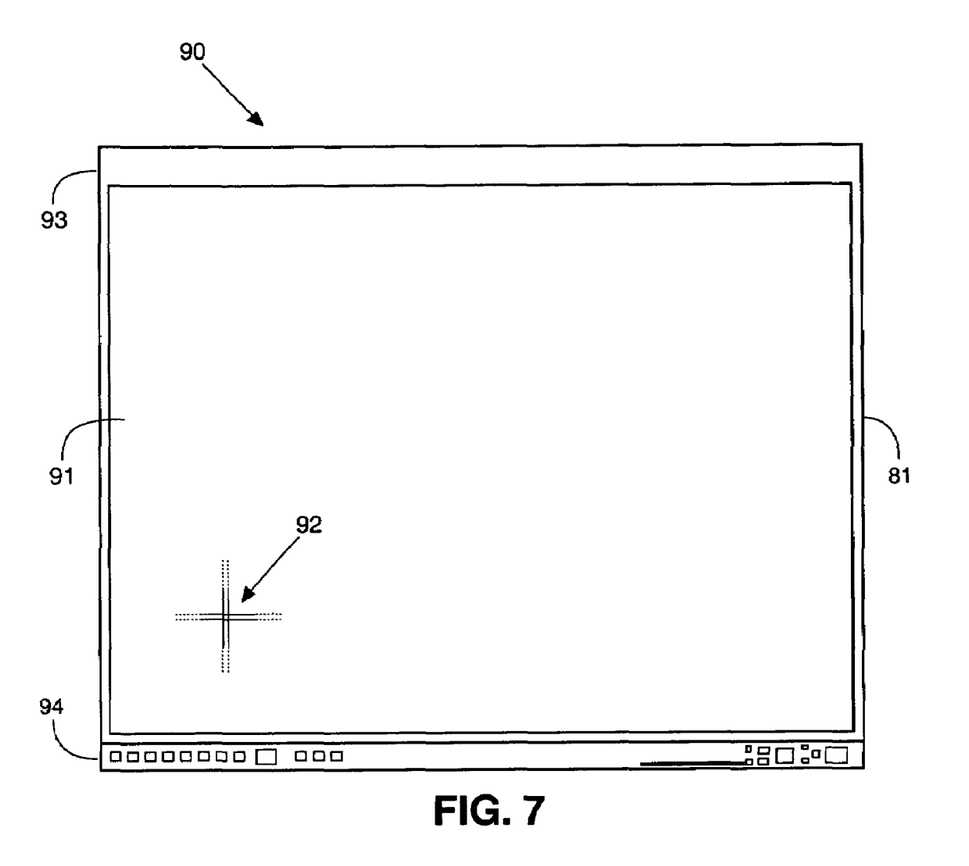
FIG. 7 is a plan view of the total extent of the flexible circuit supporting the display station.

FIG. 7 shows a plan view of the total flexible circuit 90 on substrate 81. It includes display portion 91, comprised of a repeating array of pixel display elements, represented by location 92. A top border 93 is shown, corresponding to blank substrate material that is wrapped around and secured to cylinder 61. A strip of flexible circuit 94 is also shown for attaching the IC chips and components of the electronic box, 46. For durability and light weight the preferred thickness of substrate 81 is 50-100 microns.

Figure 8:
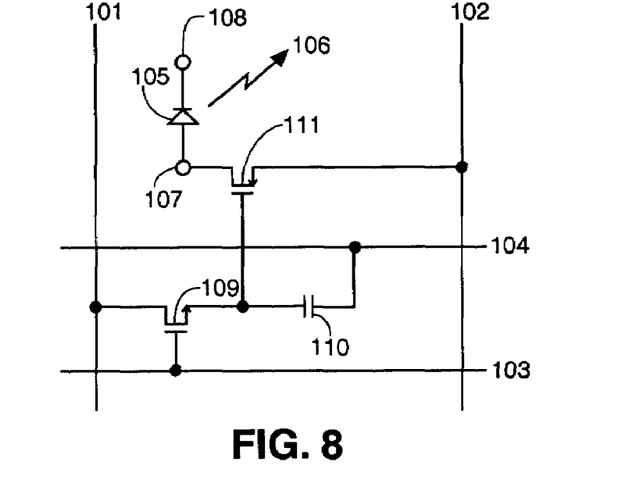
FIG. 8 is a schematic of repeating pixel circuits for an OLED display.

FIG. 8 is a schematic view of a pixel display element, such as at pixel location 92. This example circuit follows Richard Friend, "Organic Electroluminescent Displays", Society for Information Display, May 1999. Signal line 101 and supply line 102 are arrayed with scan line 103 and capacitor line 104. Light emitting polymer (LEP) diode 105 emits light 106 and connects between anode 107 and cathode 108. Switching thin film transistor, TFT, 109 feeds storage capacitor 110; the voltage stored on capacitor 110 determines the drive current and therefore the brightness of illumination of the pixel. Drive transistor 111 sends the desired current from supply line 102 through photodiode 105 to create illumination 106.

What is claimed is:

1. An information retrieval system for outputting information, including audio and visual information, received from an information source, the information retrieval system comprising: an RF transceiver configured to receive the information from the information source over a wireless communication channel; a processor coupled to the RF transceiver; and a visual display coupled to the processor and comprising: a housing; a flexible substrate having display circuits imprinted thereon to form a flexible display screen, a top portion of the display screen attached to the housing so that the display screen hangs from the housing; and at least one integrated circuit chip mounted on the display screen, the integrated circuit chip configured to receive control signals from the processor to cause the display to display the visual information received from the information source, the integrated circuit chip further acting as a weight at least partially causing the display screen to hang substantially straight from the housing; a speaker coupled to the processor, the processor configured to couple audio control signals to the speaker to cause the speaker to output the audio information received from the information source; and a voice processor coupled to the processor and configured to receive a voice command requesting the information from the information source, the RF transceiver further configured to transmit request signals to the information source corresponding to the voice command.

2. The information retrieval system of claim 1 wherein said at least one integrated circuit chip is contained in a strip at a bottom portion of the display screen.

3. The information retrieval system of claim 1 further comprising a spring that winds up and stores energy as said display screen is extended from its stored position to an extended position and upon release urges said display screen from said extended position to said stored position.

4. The information retrieval system of claim 1 wherein said at least one integrated circuit chip is configured to drive sound-generating devices.

5. An information retrieval system for outputting information, including audio and visual information, received from an information source, the information retrieval system comprising: a flexible substrate having display circuits carried thereby to form a flexible display screen; an RF transceiver carried on the flexible substrate and configured to receive the information from the information source over a wireless communication channel; a processor carried on the flexible substrate and coupled to the RF transceiver; a display driver circuit carried on the flexible substrate and coupled to the processor, the display driver circuit operable to receive visual information from the information source through the processor and couple control signals to the display circuits to cause the display circuits to display the visual information received from the information source; said display screen having a free end and said RF transceiver, processor and display driver circuit being carried on the free end of said display screen for serving as a weight to cause said display screen to hang substantially straight; a speaker coupled to the processor, the processor configured to couple audio control signals to the speaker to cause the speaker to output the audio information received from the information source; and a voice processor coupled to the processor and configured to receive a voice command requesting the information from the information source, the RF transceiver further configured to transmit request signals to the information source corresponding to the voice command.

6. The information retrieval system of claim 5 further comprising at least one integrated circuit chip carried by the display screen configured to drive the speaker.

7. The information retrieval system of claim 1 wherein said at least one integrated circuit chip includes speech recognition circuits.

8. The information retrieval system of claim 5 further comprising a speech recognition circuit carried by the display screen.

9. The information retrieval system of claim 1 wherein the at least one integrated circuit chip includes a micro-controller chip, a display driver chip and a radio-frequency chip.

10. The information retrieval system of claim 5 further comprising a micro-controller chip, a display driver chip and a radio-frequency chip carried by the display screen.

11. The information retrieval system of claim 5 wherein the free end of the display screen includes an electronics box, the display circuit being positioned in the electronics box.

12. The information retrieval system of claim 1 further comprising a spring coupled to the housing and the display screen for winding the display screen up into the housing for storage.

13. The information retrieval system of claim 12 further comprising an interlock positioned in the housing and coupled to the spring for preventing the spring from winding the display screen up into the housing while the display screen is in use.

14. An information retrieval system for outputting information, including audio and visual information, received from an information source, the information retrieval system comprising a display station comprising: an RF transceiver configured to receive the information from the information source over a wireless communication channel; a processor coupled to the RF transceiver; and a visual display coupled to the processor and comprising: a flexible display having a top portion and a bottom portion and including a flexible substrate and display circuits mounted on the flexible substrate; a display cylinder, the top portion of the flexible display being mounted inside the display cylinder, the bottom portion of the flexible display being movable from a deployed position in which the bottom portion hangs vertically downward out of the cylinder to a stored position in which the bottom portion is wound up into the cylinder; a spring assembly attached to the display cylinder for winding the flexible display up into the display cylinder; an interlock comprising a hook and a cam attached to the display cylinder for preventing the spring assembly for winding up the flexible display while the flexible display is in use; and electronics attached to the bottom portion of the flexible display and configured to receive control signals from the processor to cause the display to display the visual information received from the information source and for providing weight at least partially causing the display to hang substantially straight; a speaker coupled to the processor, the processor configured to couple audio control signals to the speaker to cause the speaker to output the audio information received from the information source; and a voice processor coupled to the processor and configured to receive a voice command requesting the information from the information source, the RF transceiver further configured to transmit request signals to the information source corresponding to the voice command; and a base station comprising: the information source; a second RF transceiver coupled to the information source configured to receive the voice command and transmit requested information form the information source; a memory configured to store voice signatures of authorized users of the information source; a processor coupled to the memory and configured to determine the voice command originated from at least one of the authorized users and transmit the information from the information source responsive to the voice command.

15. The information retrieval system of claim 14 wherein the electronics attached to the bottom portion are located on a strip of the flexible substrate.

\* \* \* \* \*